United States Patent [19]
Roos et al.

[11] Patent Number: 5,377,439
[45] Date of Patent: Jan. 3, 1995

[54] REMOTE CONTROLLED DECOY

[76] Inventors: Richard J. Roos, 3525 Weld County Rd. 13; Richard J. Roos, Jr., Rte. 2, 308 Parkway Rd., both of Erie, Colo. 80516

[21] Appl. No.: 152,048

[22] Filed: Nov. 12, 1993

[51] Int. Cl.⁶ .............................................. A01M 31/06
[52] U.S. Cl. ........................................... 43/3; 446/154
[58] Field of Search ................ 43/3, 2, 26.1; 446/154, 446/155, 156

[56] References Cited

U.S. PATENT DOCUMENTS

| | | | |
|---|---|---|---|
| 2,443,040 | 6/1948 | Jones | 43/3 |
| 2,591,554 | 5/1952 | Kinney | 43/3 |
| 2,835,064 | 5/1958 | Webb | 43/3 |
| 2,849,823 | 9/1958 | Miller | 43/3 |
| 3,689,722 | 9/1972 | Boston | 343/225 |
| 3,793,761 | 2/1974 | Bonham | 446/154 X |
| 3,916,553 | 11/1975 | Lynch | 43/3 |
| 4,322,908 | 4/1982 | McCrory | 43/3 |
| 4,612,722 | 9/1986 | Ferrell | 43/3 |
| 4,757,630 | 7/1988 | Torberg | 43/3 |
| 4,965,953 | 10/1990 | McKinney | 43/2 |

OTHER PUBLICATIONS

Popular Mechanics, Nov. 1954, p. 93.

*Primary Examiner*—P. Austin Bradley
*Assistant Examiner*—Jeanne M. Elpel
*Attorney, Agent, or Firm*—Don J. Flickinger; Robert A. Parsons; Jordan M. Meschkow

[57] ABSTRACT

A remotely controlled floating decoy having a buoyant body resembling a game bird and having a receiver disposed within the buoyant body. The receiver is responsive to commands from a transmitter and provides electrical control signals to a plurality of servomechanisms and associated linkages in response to the commands. The apparatus also has a propulsive device coupled to the buoyant body and electrically coupled to the receiver. The propulsive device is responsive to the electrical control signals. The apparatus also has a rudder coupled to a rear end of the buoyant body. The rudder is responsive to the electrical control signals. The propulsive device and the rudder cooperate to provide directed locomotion for the buoyant body in response to commands transmitted from the transmitter.

10 Claims, 4 Drawing Sheets

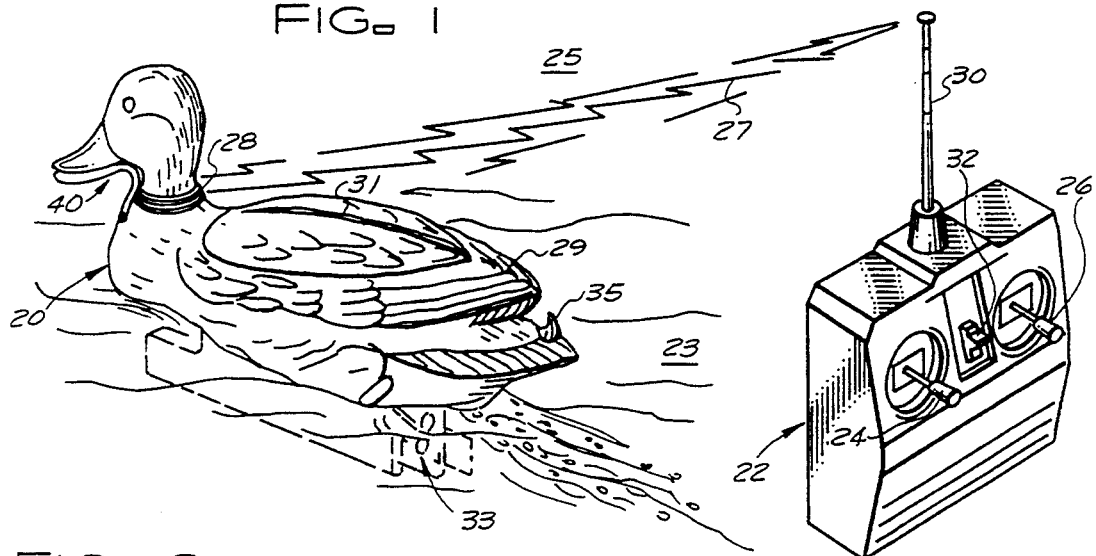
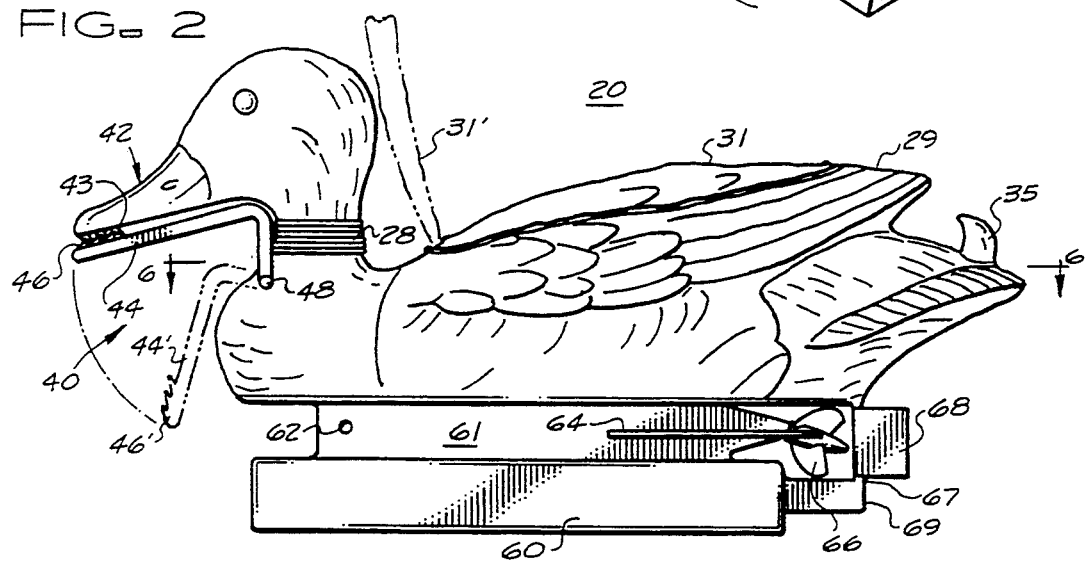
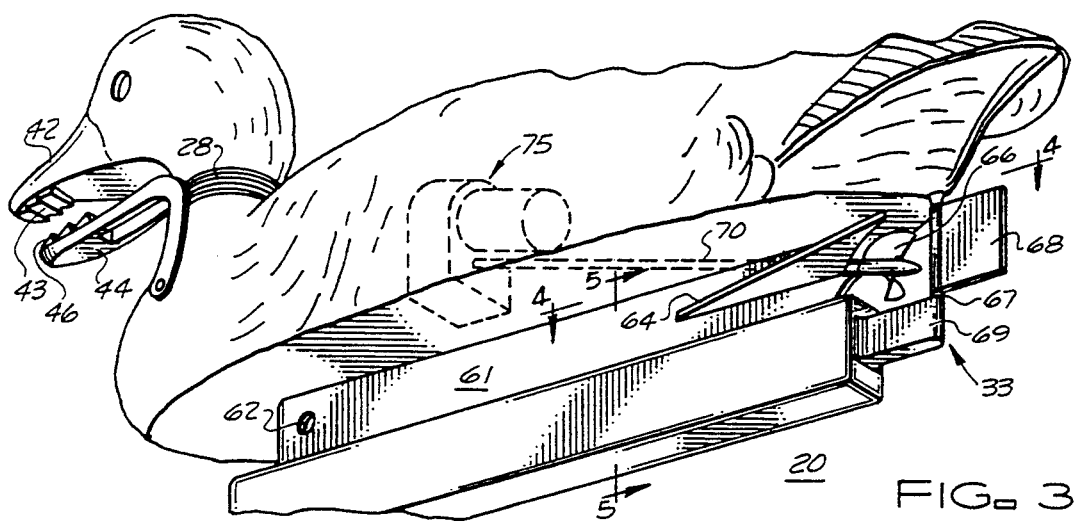

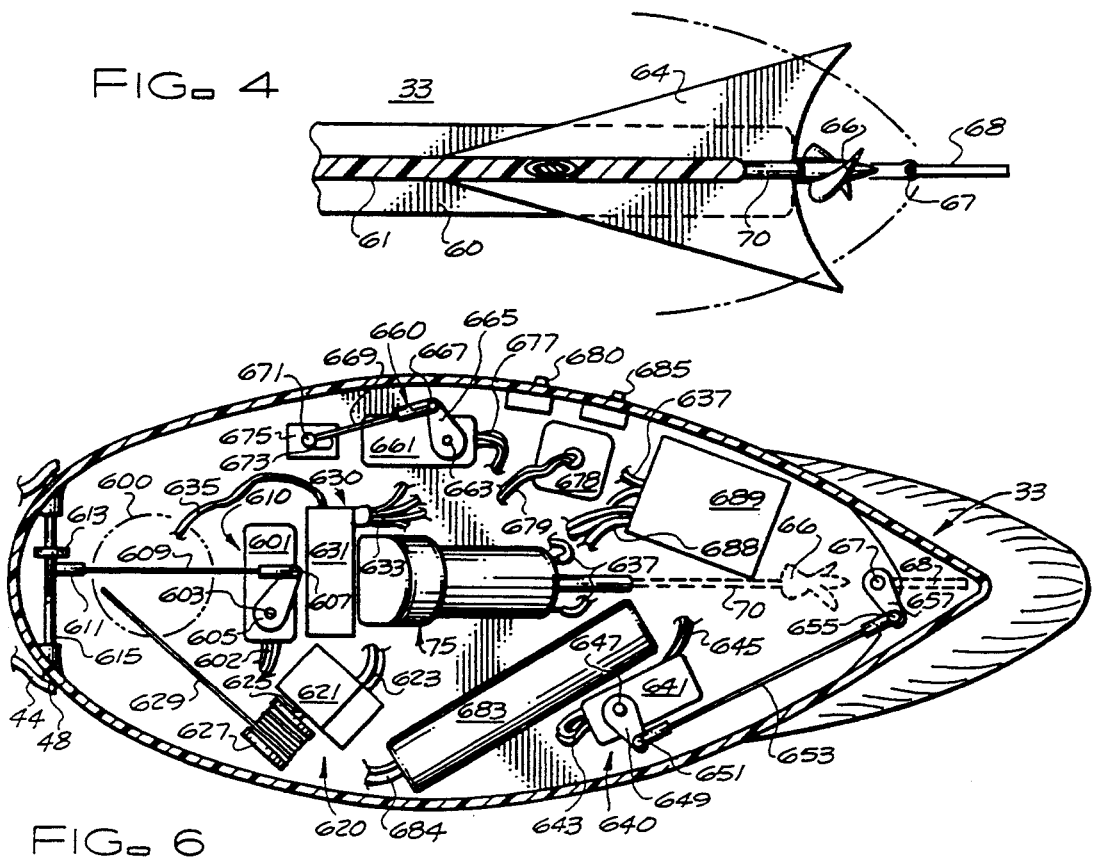
FIG. 4
FIG. 6
FIG. 5
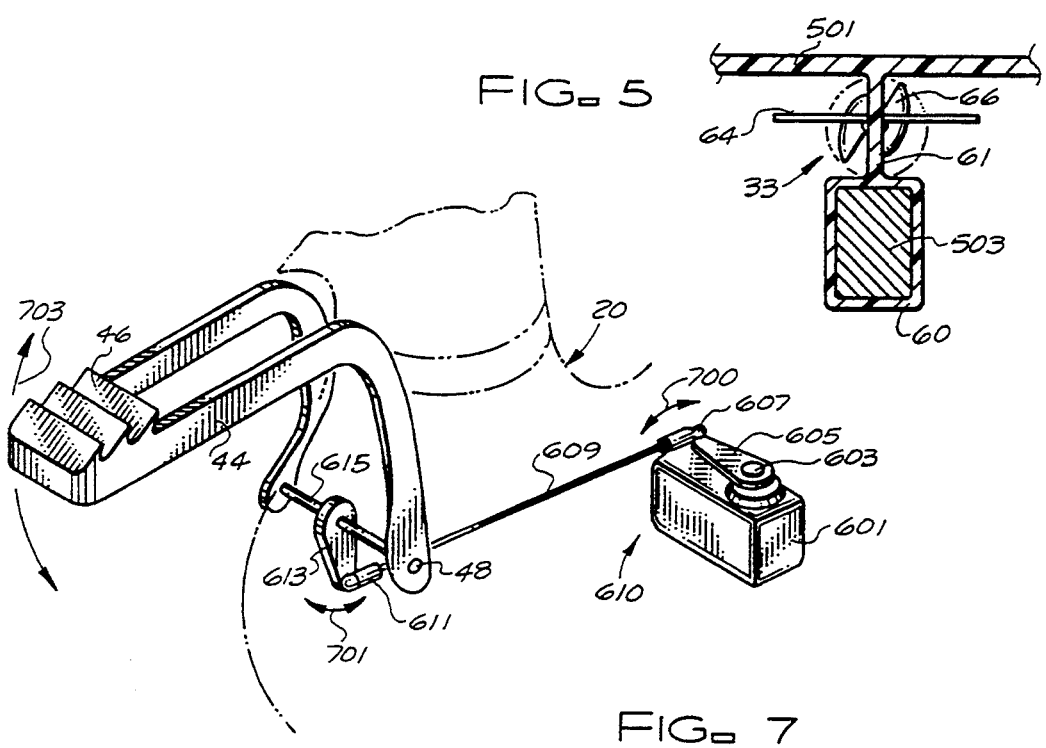
FIG. 7

REMOTE CONTROLLED DECOY

BACKGROUND OF THE INVENTION

1. Field of the Invention

This invention relates to remote controlled decoy apparatus.

More particularly, the present invention relates to remote controlled decoys having internal propulsion.

In a further and more specific aspect, the instant invention concerns a method and apparatus for a remote controlled decoy adapted to float on water and having internal propulsion, retrieval capabilities and a remotely operable anchor.

2. Prior Art

Decoys of great variety in construction and purpose are often employed as lures for hunting and to a lesser extent to attract wild animals for animal observation and/or to retrieve biological or other samples for further study. For example, wild birds, fish and other animals are often captured, for example through anesthesia, and banded, provided with radio emitting tags or otherwise distinguished from the flock, school or herd for purpose of later tracking or identification. For further example, decoys are often employed during hunting season to emulate a waterfowl or a group of waterfowl at a location suitable for feeding, for example, in order to lure migratory waterfowl to within suitable range for shooting and subsequent recovery of downed waterfowl carcasses.

Accordingly, it is often necessary to somehow approach the animal without startling it, thereby initiating flight or other escape, or to lure and capture and then retrieve the captive animal, either living but possibly comatose or sedated or in a wounded or dead state. Decoys having a life-like appearance have been used for centuries to lure feral creatures within range of hunters for subsequent capture or harvest.

While decoys often provide a life-like appearance, it is also desirable to make the decoy move in the water such that it emulates the swimming motion of a duck in a life-like fashion, for example. Many attempts have been made to so motivate a decoy. It is believed, however, that the resulting decoys are often designed such that they will tend to exhibit fixed or regular swimming or diving motion, unlike the actual motion of, by way of example, a duck.

For example, some previous decoys have employed an apparatus for causing the decoy to traverse a fixed tether or string. Hence, the decoy traverses back and forth along the tether string in a fashion which is atypical of the motion of a wild duck.

Other previous automated decoys have operated from battery-driven motors to simulate feeding waterfowl on the water's surface. Some such decoys utilize rudders which are manually preset to cause the decoy to traverse a circular path within the water body. The hunter normally has to row from the hunting blind and place the decoy on the circular path to be traversed. Disadvantages of this approach include the effort involved in placing the decoy, the presence of the hunter in the boat during the decoy launching phase, which may startle or warn the prey, and the dissimilarity of a circular path to the natural motions of feeding waterfowl, which may discourage the prey.

A further disadvantage of this approach is incurred in that the hunter, if successful in the hunt, must not only retrieve the downed bird(s) but also must chase down and recover the decoy. Additionally, the decoy may be blown off of, or otherwise deviate from, the desired course and again the hunter is obliged to leave the blind, locate, pursue and capture the decoy and replace the decoy on the path to be traversed.

Another concept which has been pursued is the solar-powered duck decoy having internal propulsion. This has disadvantages in that solar power is frequently least available when most needed, for example, at dusk when migratory waterfowl are likely to develop an interest in locating a suitable feeding ground or at dawn when such waterfowl are likely to feed prior to beginning a day's flight activity. Additionally, such apparatus is not generally accommodating of weather conditions such as an overcast day which may be otherwise well suited to the hunt.

A further concept which has been employed in prior art decoys specifically intended for use in duck hunting has been incorporation of pre-programmed variable timers intended to provide activities or motion of the decoy at pseudo-random intervals in order to attempt to more closely emulate behavioral patterns which might be associated with ducks. A disadvantage of this approach is that autonomous propulsion of the decoy, absent any controlling influence, cannot allow for natural navigational hazards, influence of wind, etc. in guiding the decoy and may provide misdirection of the decoy, possibly at times which the hunter regards as inopportune.

A further problem is that weeds, reeds, algae, discarded fishing line and other forms of flotsam, jetsam or pond scum, if present in sufficient numbers or quantity, may cause partial or complete fouling of the propulsive mechanism of the remotely controlled decoy. This may cause erratic motion atypical of the species being lured, thereby reducing the effectiveness of the decoy, or this may cause stalling and may result in inoperability or even loss of the remotely controlled decoy and/or game or other biological samples being retrieved with the assistance of the remotely controlled decoy. Again, a hunter may be obliged to leave the blind, recover and treat the decoy and then replace the decoy, running the risk of alerting the prey to the presence of the hunter and/or blind.

In order to combat these varied problems, some form of remotely controlled decoy/game retrieval apparatus is highly desirable which is simple to operate, is capable of emulating typical or appropriate game or feral animal behavioral patterns and which is robust in light of the hazards normally and reasonably expected to be present in the game environment.

While the various mentioned prior art devices function as apparatus for attracting wild animals or game, certain inherent deficiencies preclude adequate, satisfactory performance for the purpose of luring the desired species or for retrieving sedated, wounded or dead game. Dogs, for example, often employed for retrieving game, may develop the unfortunate habit of swallowing the game rather than retrieving the game intact as desired. Prior art mechanical devices tend to actualize a limited range of capabilities, and, as discussed, may provide poor simulation of some animal functions.

It would be highly advantageous, therefore, to remedy the foregoing and other deficiencies inherent in the prior art.

Accordingly, it is an object of the present invention to provide improvements in remotely controlled decoys for game birds.

Another object of the present invention is the provision of an improved nonsnagging propulsion apparatus for remotely controlled floating decoys.

And another object of the present invention is to provide an improved retrieval apparatus for downed waterfowl.

Still another object of the present invention is the provision of an apparatus for anchoring waterborne decoy devices via remote control.

Yet another object of the instant invention is to provide a method for grasping and retrieval of downed waterfowl by a remotely controlled and self propelled decoy apparatus.

Yet still another object of the instant invention is the provision of an apparatus for stabilizing a remotely controlled, floating decoy.

And a further object of the invention is to provide a method for coordinating propulsion, towing, decoy dispersing, anchoring, grasping and retrieval functions in a floating, self-propelled, remotely controlled decoy apparatus.

Still a further object of the immediate invention is the provision of a remotely controlled retractable hook for first towing a group of decoys by a remotely controlled decoy and second retracting to maintain improved lifelike appearance in a remotely controlled, self propelled towing decoy.

Yet a further object of the invention is to provide a method for remotely directing the deployment and retrieval of an anchor employed in a remotely controlled, floating decoy.

And still a further object of the invention is the provision of method and apparatus, according to the foregoing, which is intended to reduce fouling of the propulsive mechanism for a floating decoy having an internal, remotely controlled propulsion mechanism.

SUMMARY OF THE INVENTION

Briefly, to achieve the desired objects of the instant invention in accordance with a preferred embodiment thereof, provided is a remotely controlled floating decoy, comprising a buoyant body resembling a game bird and a receiver disposed within the buoyant body. The receiver is responsive to commands from a transmitter and provides electrical control signals in response to the commands. The remotely controlled floating decoy includes a propulsive device coupled to the buoyant body and to the receiver. The propulsive device is responsive to the electrical control signals. The remotely controlled floating decoy also includes a rudder coupled to a rear end of the buoyant body. The rudder is responsive to the electrical control signals. The propulsive device and the rudder cooperate to provide directed locomotion for the buoyant body in response to commands transmitted from the transmitter.

The remotely controlled floating decoy includes a rudder servomechanism mechanically coupled to the rudder and electrically coupled to the receiver. The rudder servomechanism is responsive to electrical control signals from the receiver. The rudder servomechanism mechanically directs the rudder in response to the electrical control signals.

The remotely controlled floating decoy also includes a lower mandible disposed at a front end of the buoyant body. The lower mandible has serrations disposed on an upper surface thereof. The lower mandible is hingedly attached to the buoyant body. Also included is a first mechanical linkage having a first end coupled to the lower mandible. A servomechanism is electrically coupled to the receiver and mechanically coupled to a second end of the first mechanical linkage. The servomechanism is responsive to the electrical control signals and causes the lower mandible to raise in response to a first electrical control or "CLAMP" signal and causes the lower mandible to lower in response to a second electrical control or "DO NOT CLAMP" signal.

The remotely controlled floating decoy further desirably but not essentially includes an anchor. The anchor includes a spool coupled via a cable to a weight and an anchor motor coupled to the spool. The anchor motor provides first rotation in a first rotational direction response to a first electrical "DROP ANCHOR" signal from the receiver and provides second rotation in a second rotational direction counter-rotational to the first rotational direction in response to a second electrical "RAISE ANCHOR" signal. An anchor servomechanism is coupled to the anchor motor and to the receiver. The anchor servomechanism provides the first and second electrical signals in response to signals from the receiver.

Also desirably provided with the remotely controlled floating decoy is an upper mandible disposed at a front end of the buoyant body. The upper mandible has serrations disposed on a lower surface thereof. The upper mandible hingedly attached to the buoyant body. A second mechanical linkage has a first end coupled to the upper mandible. The servomechanism is mechanically coupled to a second end of the second mechanical linkage. The servomechanism causes the upper mandible to lower in response to first electrical control "CLAMP" signals and causes the upper mandible to raise in response to second electrical control "DO NOT CLAMP" signals. The upper and lower mandibles form opposable jaws of a clamp wherein the serrations disposed on the lower and upper mandibles cooperate in grasping an object disposed therebetween when the upper and lower mandibles lower and raise, respectively, in response to the first electrical control "CLAMP" signal.

As well, the remotely controlled floating decoy includes a hook assembly for towing slave decoys. The hook assembly comprises a hook hingedly disposed on an upper surface of a rear end of the remotely controlled floating decoy and a mechanical linkage having a first end coupled to the hook. The hook assembly also includes a tailhook servomechanism responsive to the electrical control signals from the receiver and coupled to a second end of the mechanical linkage. The tailhook servomechanism retracts the hook within the remotely controlled floating decoy via the mechanical linkage to release an object, such as a slave decoy or a group of slave decoys, detachably coupled thereto when so commanded via the transmitter.

In a preferred embodiment, the remotely controlled floating decoy includes a brush guard attached to a rear end of the remotely controlled floating decoy. The brush guard comprises a first series of stiff bristles extending from the rear end along a direction roughly parallel to the shaft. The brush guard further usefully includes a second series of stiff bristles roughly orthogonal to the first series of stiff bristles. The first series of stiff bristles and the second series of stiff bristles together form a mesh substantially surrounding the propeller.

BRIEF DESCRIPTION OF THE DRAWINGS

The foregoing and further and more specific objects, features and advantages of the instant invention will become readily apparent to those skilled in the art from the following detailed description of preferred embodiments thereof taken in conjunction with the drawings in which:

FIG. 1 is an illustration of a radio controlled duck decoy and a radio controller, in accordance with the teachings of the instant invention;

FIG. 2 depicts a side view of the remotely controlled duck decoy of FIG. 1, showing a range of motion for a removable backplate cover and a first preferred embodiment of a clamping assembly including illustration of the relative placements of a jaw mechanism thereof;

FIG. 3 shows an isometric view of the remotely controlled duck decoy of FIGS. 1 and 2, including a motor coupled to a propulsive device;

FIG. 4 provides a sketch showing an enlarged plan view, in section, taken along section lines 4—4 of FIG. 3, of a propulsive device, weighted keel, stabilizer fins and rudder for the remotely controlled duck decoy of FIGS. 1 through 3;

FIG. 5 illustrates an end view, in section, taken along section lines 5—5 of FIG. 3, of the propulsive device of FIG. 4 together with a weighted keel, stabilizer fins and a bottom element, hull or plate of the remotely controlled duck decoy of FIGS. 1 through 3;

FIG. 6 depicts a plan view, in section, taken along section lines 6—6 of FIG. 2, of a portion of the remotely controlled duck decoy of FIGS. 1 through 3, illustrating relative placement of a motor and propulsive device, electromechanical servomechanisms and control linkages for a first preferred duck decoy embodiment;

FIG. 7 provides a sketch of a further enlarged isometric view, in partial section, of a first preferred embodiment of a clamping assembly comprising a jaw assembly including the jaw of FIG. 2, control linkage and electromechanical servomechanism of FIG. 6 for the remotely controlled duck decoy of FIGS. 1 through 3 and 6, illustrating relative motion of the jaw assembly elements;

DETAILED DESCRIPTION OF THE PREFERRED EMBODIMENT

Figure 8:
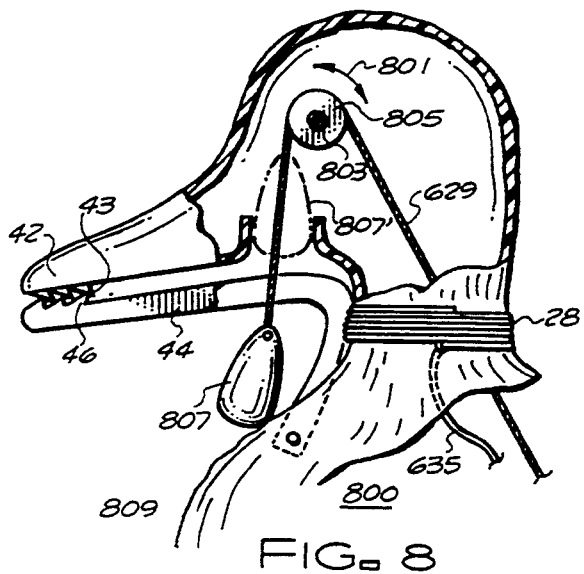
FIG. 8 shows an enlarged side view, in partial section, of a portion of the remotely controlled duck decoy of FIGS. 1 through 3 and 6 including an anchor assembly, illustrating relative motion and a retracted position of the anchor assembly elements.

Turning now to the drawings, in which like reference characters indicate corresponding elements throughout the several views, attention is first directed to FIG. 1 which illustrates radio controlled duck decoy 20 and controller 22 in accordance with the teachings of the instant invention and generally designated by the reference character 25. In accordance with the configuration chosen for purposes of illustration, remotely controlled duck decoy 20 is shown floating on a body of water 23. Remotely controlled duck decoy 20 has propulsive mechanism 33, illustrated in dotted outline, disposed at a rear end thereof below the waterline and includes a hook adapted for towing of slave decoys, for example, projecting from body 29 thereof. Remotely controlled duck decoy 20 has removable backplate cover 31 attached to body 29 for allowing replacement of batteries, service of internal components, etc.

Also shown in FIG. 1 is remote control 22 usefully comprising a radio controller as illustrated. Remote control 22 has on-off switch 32 and provides radio signals 27 in response to operation of joysticks 24 and 26. Radio signals 27 are emitted via antenna 30 and are received via antenna 28, shown disposed on the neck of remotely controlled duck decoy 20. Remotely controlled duck decoy 20 also includes jaw mechanism 40 responsive to control signals from radio transmitter 22.

In operation, remotely controlled duck decoy 20 usefully is capable of towing slave decoys into position via hook 35 and emulating motions typical of feeding ducks, for example, under the control of a person (not illustrated) operating radio controller 22. Remotely controlled duck decoy 20 is also capable of steering to avoid natural hazards normally associated with the game environment and is further capable of retrieving downed game using jaw mechanism 40 in response to human control, avoiding need for separate retrieval by the hunter of either the game or the decoy.

Turning now to FIG. 2, a side view of remotely controlled duck decoy 20 of FIG. 1 is depicted, showing a range of motion for removable backplate cover 31 and also showing a first preferred embodiment of a clamping assembly including illustration of the relative placements of jaw mechanism 40 thereof. An open position of removable backplate cover 31 is shown in dotted outline 31'.

Jaw mechanism 40 includes lower jaw 44 illustrated in a first or closed position thereof and having teeth or serrations 46 disposed on an upper surface thereof and hingedly attached at location 48 to body 29 of remotely controlled duck decoy 20. Also included is upper jaw 42 having teeth or serrations 43 disposed on a lower surface thereof. In the position illustrated, jaw mechanism 40 is able to grasp or hold downed game between lower jaw 44 and upper jaw 42. Jaw mechanism 40 is able to retract to a second position indicated by dashed outlines of lower jaw 44' and serrations 46' in order to establish a hold on the prey to be retrieved by remotely controlled duck decoy 20 following success in the hunt.

Also illustrated in FIG. 2 are weighted keel 60 attached to body 29 via keel rib 61. Keel rib 61 includes opening 62 disposed towards a front end thereof to facilitate towing of remotely controlled duck decoy 20 if desired. Propulsive device 33 is associated with stabilizing fins 64 which are also attached to keel rib 61 at a rear end thereof. Propulsive device 33 also includes propeller 66, rudder 68, rudder pivot 67 and rudder pivot support 69.

Referring now to FIG. 3, a sketch illustrating an isometric view of remotely controlled duck decoy 20 of FIGS. 1 and 2 is shown, including remotely controlled motor 75 coupled to propulsive device 33, shown in dotted outline. Remotely controlled duck decoy 20 is desirably fitted and colored to resemble a teal, merganser, bufflehead, redheaded, mallard, canvasback, pintail, eider, bluebill (scaup) or wood duck or other waterfowl as is appropriate to the area being hunted, the season and the preferences of the hunter(s).

Reference is now made to FIG. 4, which provides a drawing of an enlarged plan view, in section, taken along section lines 4—4 of FIG. 3, of propulsive device 33, weighted keel 60, stabilizer fins 64 and rudder 68 for remotely controlled duck decoy 20 of FIGS. 1 through 3.

The particular embodiment of propulsive device 33 illustrated in FIG. 4 includes propeller 66 attached to shaft 70. Shaft 70 is coupled to motor 75 (FIG. 3) responsive to a human operator (not shown) interacting therewith via radio controller 22 (FIG. 1). Motor 75 desirably provides clockwise or counterclockwise rotation of shaft 70 in response to signals transmitted by radio controller 22, allowing propeller 66 to provide either forward or reverse motion to remotely controlled duck decoy 20 (FIGS. 1 and 2).

Also shown in FIG. 4 are remotely controlled rudder 68 and rudder pivot 67. Remotely controlled rudder 68 is responsive to a human operator (not shown) interacting therewith via radio controller 22 (FIG. 1). Remotely controlled rudder 68 allows remotely controlled duck decoy 20 of FIGS. 1 and 2 to be steered in response to commands from the human operator (not illustrated).

The combination of forward and reverse propulsion capabilities provided by propeller 66, shaft 70 and motor 75 coordinated in concert with remotely controlled rudder 68 allow remotely controlled duck decoy 20 to be steered around obstructions, to be freed from awkward positions which may result from wind action or submerged navigation hazards such as underwater branches or weeds, for example, and also facilitate maneuvering of remotely controlled duck decoy 20 in order to grasp and subsequently retrieve downed game in accordance with instruction communicated from the human operator (not shown) via radio controller 22 of FIG. 1. This combination also enables ready towing of slave decoys, emulation of natural motion of feeding ducks and retrieval of game under the guidance of the hunter (not illustrated).

It will be appreciated by those of skill in the art that while propulsive device 33 has been illustrated and discussed in terms of electric motor 75 coupled to shaft 70 and in turn to propeller 66, many variations are possible and are intended to be encompassed within the scope of the invention as described herein. For example, gasoline or other fueled motor apparatus may be substituted for motor 75.

Similarly, shaft 70 may be replaced by a belt, gear, worm gear, jointed shaft or other coupling device(s) alone or in suitable combination for transferring propulsive power from a motor such as motor 75 to a drive mechanism such as propeller 66. As well, propeller 66 may be usefully replaced by alternative drive mechanisms, such as, by way of example, paddlewheel(s), oar-like devices, jet- or pump-type propulsion mechanisms and the like without departing from the spirit and intent of rendering remotely controlled duck decoy 20 capable of locomotion under the control of a human operator (not shown) by way of suitable controlling apparatus.

As seen in further detail with reference to FIG. 5, which provides a sketch of an end view, in section, taken along section lines 5—5 of FIG. 3, of propulsive device 33 of FIG. 4, showing the relationships between keel 60, keel weight 503, keel rib 61, stabilizer fins 64 and bottom element, hull or plate 501 of remotely controlled duck decoy 20 of FIGS. 1 through 3.

The mass of weight 503 is empirically chosen to be sufficiently large to maintain remotely controlled duck decoy 20 in an upright floating position, independent or largely independent of light breezes and/or currents and to also stabilize remotely controlled duck decoy 20 against minor collisions with underwater, near-surface and/or floating debris such as logs, brush, twigs, weeds, reeds, cattails and the like and yet not so large as to prevent appropriate buoyancy of remotely controlled duck decoy 20 in operation as a decoy or in executing retrieval functions under control of an operator (not shown) via radio controller 22 (see FIG. 1). Stabilizing fins 64 provide an additional measure of dynamic stability and "trueness to course" for remotely controlled duck decoy 20 of FIGS. 1 through 3, especially when operating in coordination with weighted keel 60 and keel rib 61. The combined operation of these elements reduces, course deviations due to inclement weather and/or the destabilizing influence of a game bird being retrieved by remotely controlled duck decoy 20.

Turning now to FIG. 6, a plan view, in section, taken along section lines 6—6 of FIG. 2, is shown of portion 23 of remotely controlled duck decoy 20 of FIGS. 1 through 3, illustrating relative placement of motor 75 and propulsive device 33, receiver/controller assembly 630 and a plurality of electromechanical servomechanisms and control linkages effecting locomotion, anchoring, grasping and retrieval functions for a first preferred duck decoy embodiment.

Receiver/controller assembly 630 includes controller 631 coupled via wires 633 to the plurality of electromechanical servomechanisms, motors and control linkages effectuating actions of remotely controlled duck decoy 20 of FIGS. 1 through 3 and 6 and also is coupled via antenna lead-in 635 to antenna 28 (not shown in FIG. 6; see FIGS. 1 through 3, supra, and FIG. 8, infra) preferably disposed atop remotely controlled duck decoy 20, for example on or near the head or neck (which latter has position indicated by dotted outline 600) of remotely controlled duck decoy 20 in order to improve antenna gain thereof.

Portion 23 includes jaw or clamping servomechanism assembly 610, anchor motor assembly 620 and anchor servomechanism and switch assembly 660, rudder servomechanism assembly 640, receiver assembly 630, motor 75 and propulsive device 33 including propeller 66, rudder 68 and rudder pivot 67.

Jaw or clamping servomechanism assembly 610 includes jaw servomechanism 601 coupled via wires 602 to controller 631 (discussed in association with FIG. 9, infra) and operation of jaw or clamping servomechanism assembly 610 is responsive to signals communicated from an operator (not illustrated) via radio controller 22 to controller 631 and thence through wires 633 and 602.

In response to the signals coupled via wires 602, servomechanism 601 causes shaft 603 to rotate, in turn causing lever 605 to pull or push rod 609, which is attached to lever 605 via hinged joint 607 disposed at a first end of lever 605. Lever 605 is coupled at a second end thereof via hinged joint 611 to lever 613 and thereby to shaft 615. Motion from servomechanism 601 is thus coupled to shaft 615 and thereby to jaw 44 (FIGS. 1 through 3), actuating jaw 44 to open or close as required in response to signals from an operator (not shown) communicated via radio controller 22 (FIG. 1). Jaw 44 is thus able to grip downed game birds for retrieval following success in the hunt.

Figure 9:
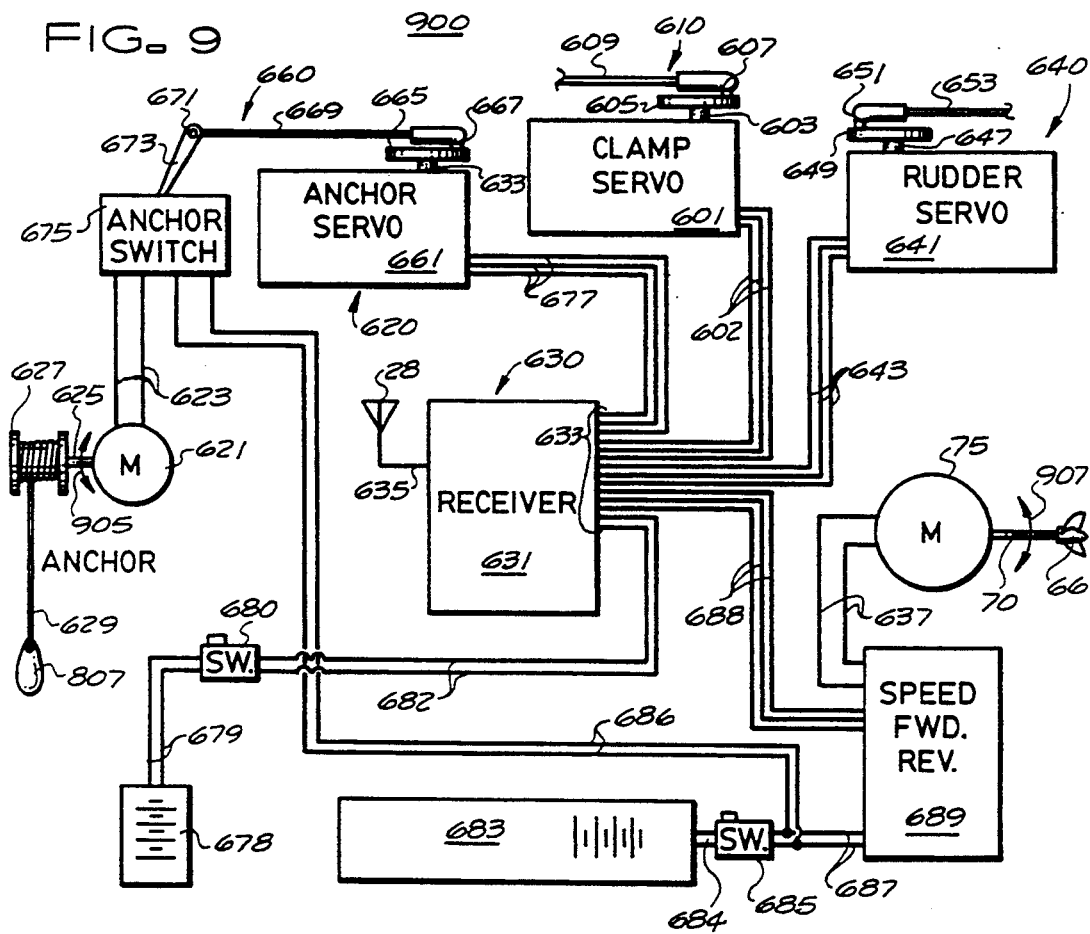
FIG. 9 is a schematic block diagram of a portion of a remotely controlled actuator system internal to the remotely controlled duck decoy of FIGS. 1 through 3 and 6.

Anchor motor assembly 620 includes anchor motor 621 coupled via wires 623 to switch and anchor servomechanism 660, which is in turn responsive to controller 631 (discussed in association with FIG. 9, infra). Anchor motor 621 is controlled by signals communicated therefrom via wires 623 and causes spool 627 to rotate, either spooling or playing out cable 629.

Anchor servomechanism and switch assembly 660 further includes anchor servomechanism 661 coupled via wires 677 to controller 631 (discussed in association with FIG. 9, infra) and which is controlled by electrical signals communicated therefrom via wires 677. Anchor servomechanism 661 rotates shaft 663 in response to controller signals, causing lever 665 to push or pull rod 669, which is coupled to a first end of lever 665 via hinged joint 667. A second end of rod 669 is coupled via hinged joint 671 to switch lever 673, which is toggled in response to rotation of shaft 663. Switch 675, desirably a normally open double throw switch, is thus toggled between either of two closed states (corresponding to "drop anchor" and "raise anchor") and an open state (corresponding to "cruise", "engine off" or "park", depending on signals communicated to other servomechanisms via controller 631 and ancillary apparatus), wherein anchor motor 621 is disabled and does not rotate.

Rudder servomechanism assembly 640 includes rudder servomechanism 641 coupled via wires 643 and 645 to controller 631 (discussed in association with FIG. 9, infra) and is controlled by signals communicated therefrom via wires 643 and 645.

In response to control signals, rudder servomechanism 641 rotates shaft 647, which is in turn coupled to a first end of rod 653 via hinged joint 651. A second end of rod 653 is coupled via hinged joint 655 to lever 657 and thence via rudder pivot 67 to rudder 68. Rudder 68 thus is moved left or right in response to control signals coupled to rudder servomechanism 641 via wires 643 and 645 from controller 631, discussed in association with FIG. 9, infra. Remote controlled duck decoy 20 is thus steered in response to signals transmitted by an operator (not shown) via radio controller 22 (see FIG. 1).

Motor 75 has power cables 637 coupled to battery 683 via "on-off" switch 685 and electrically controlled switch 689 having electrical interconnections 688. Further discussion of the connection of motor 75 to switch 685 etc., is found in text associated with FIG. 9, infra. Motor 75 is mechanically coupled to shaft 70 having propeller 66 disposed thereon. Propeller 66 thus desirably moves remotely controlled duck decoy 20 through water 23 in a forward or reverse direction or is still in response to signals transmitted by an operator (not illustrated) via radio controller 22 (see FIG. 1).

Portion 23 also includes ancillary apparatus such as on-off switches 680 and 685, batteries 678 and 683 having associated wires 679 and 684, respectively, and motor controller 689. On-off switch 680 is coupled to battery 678 via wires 679 and couples battery 678 to receiver/controller 631, and on-off switch 685 is coupled to battery 683 and couples battery 683 to remotely controlled motor switch 689 and thence to motor 75 and also couples battery 683 to anchor switch 675 and thence via wires 623 to anchor motor 621, when remotely controlled duck decoy 20 (FIGS. 1 through 3) is deployed. The detailed interconnections of these elements are illustrated in schematic form in FIG. 9, infra.

Remotely controlled motor switch 689 is responsive to human operator control via signals from radio controller 22 (FIG. 1) which cause controller 631 to provide "forward", "reverse" and "stop motor" control signals via wires 688. Remotely controlled motor switch 689 in turn couples battery 683 to motor 75 to effect forward or reverse actions or decouples battery 683 from motor 75 to stop motor 75, providing remotely controlled duck 20 (FIGS. 1 through 3) with locomotive and maneuvering capabilities.

For further example of additional desirable capabilities, reference is now made to FIG. 7, which provides a sketch of a further enlarged isometric view, in partial section, of portion 705 including a first preferred embodiment of a clamping assembly comprising jaw assembly 40 (FIGS. 1 through 3), including lower jaw 44 of FIG. 2 and control linkage and electromechanical servomechanism 610 of FIG. 6, for remotely controlled duck decoy 20 of FIGS. 1 through 3 and 6, illustrating relative motion of the jaw assembly elements.

When servomechanism 601 is actuated in response to signals from a person employing radio controller 22 (FIG. 1), lever 605 rotating on shaft 603 moves along a path indicated by direction arrows 700. This motion is coupled via rod 609 to lever 613 disposed on shaft 615, causing lever 613 to move along a path indicated by direction arrows 701 and rotating shaft 615 in accordance therewith. Shaft 615 is coupled at ends 48 thereof to lower jaw 44, which moves along a path indicated by direction arrows 703 in response to motion of shaft 615, and causes lower jaw 44 to open or to close (e.g., clamping against upper jaw 42, FIG. 2) in accordance with signals provided by a human operator (not shown) via radio controller 22 (FIG. 1).

An additional useful feature is now described with reference to FIG. 8, which provides a drawing of portion 800 showing an enlarged side view, in partial section, of anchor assembly 809 for remotely controlled duck decoy 20 of FIGS. 1 through 3 and 6, and which illustrates relative motion and a retracted position of the anchor assembly elements.

Anchor assembly 809 includes cable 629 coupled to drum 627 (FIG. 6) and responsive to signals from an operator (not shown) employing radio controller 22

(FIG. 1). These signals are received via antenna 28 and are coupled therefrom through antenna lead-in 635 to controller 631 (FIG. 6) and deployment or retraction of anchor 807 is effectuated in turn via anchor servomechanism and switch assembly 660 and anchor motor 621.

Cable 629 is desirably realized as a light wire cable, a plastic cable (e.g., fishing line) or in the form of string suitable to the conditions in which remotely controlled duck decoy 20 (FIGS. 1 through 3 and 6) operates. Cable 629 moves along a path indicated by direction arrows 801, about pulley 805 disposed on pulley shaft 803, causing anchor 807 to extend as shown or to retract (shown by dotted outline and indicated by the reference character 807') in response to signals from an operator (not illustrated).

As illustrated in FIG. 8, anchor 807 desirably is realized as a smooth weight, such as a lead fishing weight, providing stabilization of the position of remotely controlled duck decoy 20 without snagging as could occur with anchors employing flukes or other grappling apparatus in the weedy environments typical of the shallow waters wherein ducks tend to feed, for example.

Anchor 807 and cable 629 pass between the two sides of lower jaw 44 and typically anchor 807 is deployed or lowered at a time when lower jaw 44 is not being employed for clamping an object (such as a downed duck) during retrieval, and vice versa, allowing these two mechanisms to operate independently and without mutual interference therebetween.

Turning now to FIG. 9, a schematic block diagram of a portion of a remotely controlled actuator system generally designated by the reference character 900 is illustrated. Remotely controlled actuator system 900 is internal to remotely controlled duck decoy 20 of FIGS. 1 through 3 and 6, as is illustrated in some exemplary detail in FIG. 6.

Remotely controlled actuator system 900 is responsive to human control effectuated through signals coupled via radio controller 22 of FIG. 1, for example, and realizes a number of remotely controlled functions including locomotion, towing and release, stationary positioning and retrieval through servomechanisms discussed in connection with FIGS. 1 through 8, supra, and also in connection with FIGS. 10 through 14, infra, in response to these signals.

Remotely controlled actuator system 900 has antenna 28 coupled via antenna lead-in 635 to radio receiver/controller 631. Radio receiver 631 receives (via antenna 28 and antenna lead-in 635), decodes and distributes control signals from radio controller 22 (FIG. 1), realizing control functions for the servomechanisms coupled to radio receiver 631 and effectuating the functions of remotely controlled duck decoy 20 of FIGS. 1 through 3 and 6. Remotely controlled actuator system 900 also includes battery 678 coupled via wires 679 to on-off switch 680 and thence via wires 682 to receiver 631, providing power for receiver 631 which is independent of the power supply for the motor and anchor assemblies 75 and 620.

It will be appreciated by those of skill in the art that while radio receiver 631 and radio controller 22 (FIG. 1) are illustrated, control systems employing other communication links between a human operator (not shown), such as, by way of example and not intended to be limiting, optical communications links such as infrared links, sonic or ultrasonic communication links, wire communication links and/or even pre-programmed instructions, either alone or in any suitable combination, may be usefully employed to realize and/or actuate at least some of the functions of remotely controlled duck decoy 20 of FIGS. 1 through 3 and 6.

Radio receiver 631 is coupled via wires 602 to clamp servomechanism 601 and operates lower jaw 44 (FIGS. 1 through 3, 7 and 8) in response to signals originating in a human operator (not shown) as discussed in detail with reference to FIG. 6, supra. Lower jaw 44 is normally maintained in a closed position and may be opened to engage a floating object such as a downed game bird and then closed or clamped in response to further control signals in order to retrieve the floating object for further activities as desired.

Radio receiver 631 is coupled via wires 677 to anchor servomechanism and switch assembly 660, anchor motor assembly 620 and thence effectuates deployment and retraction of anchor 807 (FIG. 8) in response to signals originating from a human operator (not illustrated) as discussed in detail with reference to FIGS. 6 and 8, supra.

Anchor 807 is normally maintained within the head portion of remotely controlled duck decoy 20 (see anchor 807', FIG. 8) during execution of locomotion, retrieval and towing activities and is deployed during some luring activities in order to assist remotely controlled duck decoy 20 in maintaining a desired location, for example. Signals coupled from receiver 631 toggle anchor switch 675 via anchor servomechanism 661 and associated mechanical linkages, causing anchor motor 620 to either retract or deploy anchor 807 as desired in response to control signals sent from radio controller 22 (FIG. 1) by a human operator (not shown).

Electrical power is supplied from battery 683 via wires 684 to on-off switch 685 and thence via wires 686 to anchor switch 675 (and also via wires 687 to motor controller 689). Electrical power is in turn coupled from anchor switch 675 to anchor motor 621, causing rotation of shaft 625 and drum 627 along the path indicated by direction arrows 905. Switch 675 is desirably a double throw switch having a "center off" or normally open feature and reverses the polarity of the power supplied from battery 683 to anchor motor 621 to effect the two directions of travel required for spool 627.

Electrical power is also in turn coupled from motor controller 689 to motor 75 via wires 637, causing rotation of shaft 70 having propeller 66 thereon along the path indicated by direction arrows 907 and thereby effectuating locomotion of remotely controlled duck decoy 20 of FIGS. 1 through 3 and 6.

Electrically controlled switch 689, desirably realized as a normally-open, double-throw switch, is thus toggled between either of two closed states (corresponding to "forward" and "reverse"), wherein motor 75 is enabled and rotates or counter-rotates, and an open state (corresponding to "neutral", "motor off" or "park" depending on signals communicated to other servomechanisms via controller 631 and ancillary apparatus), wherein motor 75 is disabled. Propeller 66 thus moves remotely controlled duck decoy 20 through water 23 in either a forward or a reverse direction or is still in response to signals transmitted by an operator (not shown) via radio controller 22 (see FIG. 1).

Radio receiver 631 is coupled via wires 643 to rudder assembly 640. Rudder servomechanism 641 is responsive to control signals coupled from radio receiver 631 via wires 643 and effects motion of rudder 68 (FIGS. 2 through 4) via lever 649 and rod 653, as discussed in detail with reference to FIG. 6, supra.

A further advantageous feature is now described with reference to FIG. 10, which illustrates a detailed side view, in partial section, of tail portion 1000 including tow hook 35 and release mechanism 1005 and also including electromechanical servomechanism 1010 and linkage assembly 1015, for remotely controlled duck decoy 20 of FIGS. 1 through 3 and 6.

Electromechanical servomechanism 1010 is desirably realized as remotely controlled servomechanism 1020 responsive to signals coupled from controller 631 (FIGS. 6 and 9, supra) via wires, (not shown) in much the same fashion as described hereinabove with respect to other remotely controlled elements.

Remotely controlled servomechanism 1020 has shaft 1022 coupled to lever 1024 and lever 1024 rotates together with shaft 1022 in response to control signals. Lever 1024 is coupled via hinged joint 1026 to a first end of coupling rod 1028. Coupling rod 1028 moves, for example, in a direction indicated by direction arrow 1029 in response to rotation of lever 1024 on shaft 1022. Coupling rod 1028 is attached at a second end thereof to tow hook 35 via hinged joint 1032. Lever action of tow hook 35 using hinged joint 1034 as a fulcrum causes tow hook 35 to rotate about hinged joint 1034 in a direction indicated by direction arrow 1036, retracting tow hook 35 within the body or shell of tail portion 1000 and also releasing tow attachment 1038, usefully realized as a string as illustrated.

This action, performed via remote control in accordance with instructions conveyed from a human operator (not shown) through a controller such as radio controller 22 (FIG. 1), realizes two goals simultaneously; (1) the appearance of remotely controlled duck decoy 20 (FIGS. 1 through 3 and 6) is rendered more consistent with that of the desired prey, and (2) other decoys (or other apparatus as desired) towed via tow hook 35 and tow attachment or tether 1038 are released for purpose of emulating a group of ducks, for example.

Figure 12:
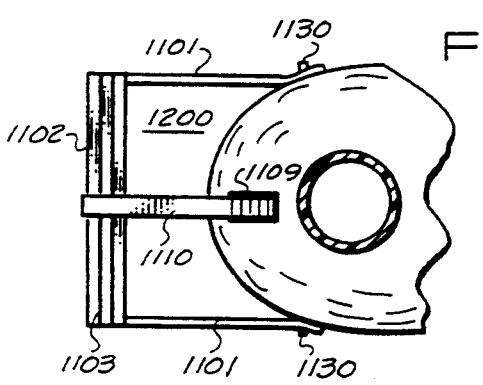
FIG. 12 shows a plan view, in partial section, of the second preferred embodiment of the clamping assembly of FIG. 11 including upper and lower mandibles thereof.
Figure 13:
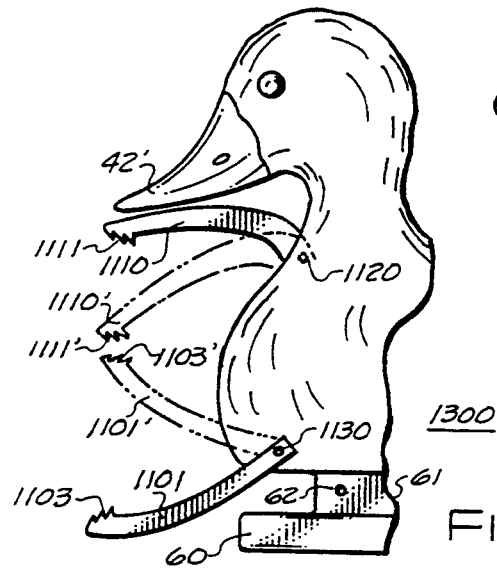
FIG. 13 illustrates a partial side view of the second preferred embodiment of the clamping assembly of FIGS. 11 and 12, depicting open and clamped positions of the upper and lower mandibles thereof.
Figure 11:
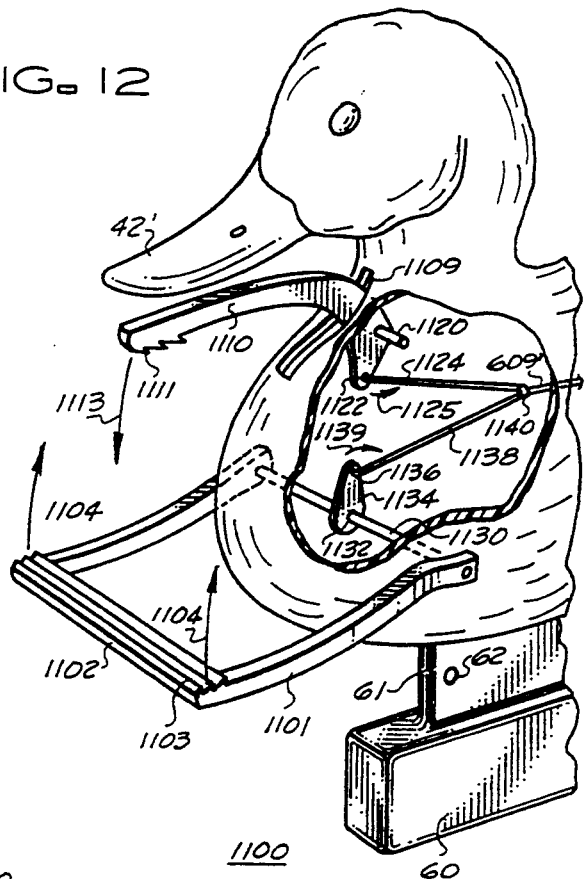
FIG. 11 provides a sketch of an isometric view, in partial section, of a second preferred embodiment of a clamping assembly including upper and lower mandibles and associated linkages for the remotely controlled duck decoy of FIGS. 1 through 3 and 6, illustrating relative motion of the elements thereof.

Attention is now drawn to FIGS. 11 through 13, providing several views of a second preferred embodiment of a clamping assembly in accordance with the present invention. FIG. 11 provides a sketch showing an isometric view, in partial section, of decoy portion 1100 wherein a second preferred embodiment of a clamping assembly is depicted which includes upper and lower mandibles 1110 and 1101 and associated linkages for remotely controlled duck decoy 20 of FIGS. 1 through 3 and 6 and which illustrates relative motion of the elements thereof.

Decoy portion 1100 comprises lower mandible 1101 having teeth or serrations 1103 disposed along an upper surface of horizontal member 1102 and fixed upon shaft 1130. Shaft 1130 passes through and is attached to opening 1132 at a first end of lever 1134 and provides a fulcrum for lever 1134. A second end of lever 1134 has a first end of lower linkage 1138 attached to opening 1136. A second end of lower linkage 1138 is attached at joint 1140 to linkage 609', analogous to rod 609 (FIGS. 6 and 9) and responsive to servomechanism 601 in a similar fashion.

When linkage 609' moves or pulls in response to pulling from servomechanism 601, lever 1134 moves as indicated by direction arrow 1139, causing shaft 1130 to rotate and moving lower mandible 1101 in a direction indicated by direction arrows 1104 in response to signals sent by a human operator (not illustrated) via radio controller 22 (FIG. 1), for example.

Decoy portion 1100 further comprises upper mandible 1110 passing through opening 1109 in decoy portion 1100 and having teeth or serrations 1111 disposed along a lower surface upper mandible 1110, which is in turn fixed upon shaft 1120. Upper mandible 1110 is coupled to a first end of upper linkage 1124 at opening 1122 in upper mandible 1110. Upper linkage 1124 is coupled at a second end thereof to joint 1140 and thus to linkage 609', analogous to rod 609 of FIGS. 6 and 9, supra, and responsive to servomechanism 601 in a similar fashion.

When linkage 609' moves or pulls in response to pulling from servomechanism 601, opening 1122 of upper mandible 1110 moves as indicated by direction arrow 1125, causing upper mandible 1110 to rotate about shaft 1120 (which acts as a fulcrum) and moving upper mandible 1110 in a direction indicated by direction arrow 1113 in response to signals sent by a human operator (not shown) via radio controller 22 (FIG. 1), for example.

For further and more detailed example, reference is now made to FIG. 12, which illustrates a plan view, in partial section, of the second preferred embodiment of the clamping assembly of FIG. 11 including upper and lower mandibles 1110 and 1101 thereof. FIG. 12 provides an illustration of the relationship obtaining between upper mandible 1110 and lower mandible 1101, showing how gripping action is obtained when forced together via pressure applied through upper and lower linkages 1124 and 1138.

The operation of the embodiment of FIGS. 11 and 12 is more clearly understood from study of FIG. 13, which is a sketch showing a partial side view of decoy portion 1300 including the second preferred embodiment of a clamping assembly of FIGS. 11 and 12, and which depicts open and clamped positions of upper and lower mandibles 1110 and 1101 thereof.

FIG. 13 depicts upper mandible 1110 in a first (open) position and shows upper mandible 1110' in dotted outline corresponding to a second (closed) position. FIG. 13 also depicts lower mandible 1101 in a first (open) position and shows lower mandible 1101' in dotted outline corresponding to a second (closed) position. The second, closed positions of upper and lower mandibles 1110' and 1101' correspond to the position suitable for grasping prey such as a downed waterfowl or game bird for purpose of retrieval.

Three advantages associated with the second preferred embodiment of a clamping assembly include (1) a broad grasping surface (e.g., horizontal member 1102, FIGS. 11 and 12) well adapted to and consonant with the anticipated size of suitable prey, (2) compound gripping action due to motion of both upper and lower mandibles 1110 and 1101 and also (3) optimal positioning of lower mandible 1101 in the first position (i.e., near or beneath a waterline, not illustrated) for contacting and then grasping prey floating near remotely controlled duck decoy 20 of FIGS. 1 through 3 and 6. The broad surface provided by horizontal member 1102 (FIG. 11) coupled with the compound gripping action of upper and lower mandibles 1110 and 1101 further promote retaining grasp of the prey during locomotion associated with retrieval.

Figure 14:
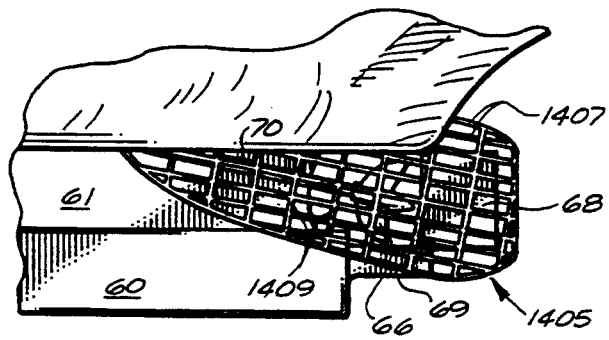
FIG. 14 depicts a partial side view of a portion of the remotely controlled duck decoy of FIGS. 1 through 3, providing a detailed side view of the propulsive device of FIGS. 1 through 6 and illustrating a brush guard assembly at least partially surrounding the propulsive device.

Another desirable feature is shown in FIG. 14, depicting a partial side view including portion 1400 of remotely controlled duck decoy 20 of FIGS. 1 through 3 and 6. FIG. 14 provides a detailed side view of propulsive device 33 of FIGS. 1 through 6 and illustrates brush guard assembly 1405 at least partially surrounding propulsive device 33.

Brush guard 1405 desirably comprises quasi-horizontal members 1407 which may be fashioned from wire, plastic or other materials providing sufficient stiffness to maintain a sufficient clearance from propeller 66 and rudder 68 to avoid fouling of either in the course of normal operations. In one embodiment, quasi-horizontal members 1407 do not completely surround propeller 66 and rudder 68 but rather project back and end in the neighborhood of the rear of rudder 68. This allows for easy access to rudder 68 and propeller 66 for removal of debris such as floating weeds, algae or other pond scum and also permits ready service (including lubrication, etc.) and/or adjustment of propeller 66 and/or rudder 68 and rudder pivot 67 as may be required from time-to-time.

Brush guard 1405 desirably comprises quasi-vertical members 1409 which may be fashioned from wire, plastic or other materials providing sufficient stiffness to maintain a sufficient clearance from propeller 66 and rudder 68 to avoid fouling of either in the course of normal operations. In another preferred embodiment, quasi-horizontal members 1407 and quasi-vertical members 1409 form basket-like brush or weed guard 1405 as illustrated in FIG. 14, surrounding or partially surrounding propeller 66 and rudder 68. In this embodiment, and especially for brush guards 1405 which surround propeller 66 and rudder 68, brush guard 1405 usefully is readily detachable from portion 1400 to allow removal of debris from propeller 66, rudder pivot 67 and/or rudder 68 and also to permit periodic (e.g., lubrication) or aperiodic (i.e., repair) servicing as required.

Brush guard 1405 thus forms a convenient adjunct to remotely controlled duck decoy 20 or FIGS. 1 through 3 and 6, adapting same to the environments typical of duck feeding grounds and enhancing the utility of remotely controlled duck decoy 20 in the intended use thereof.

Figure 10:
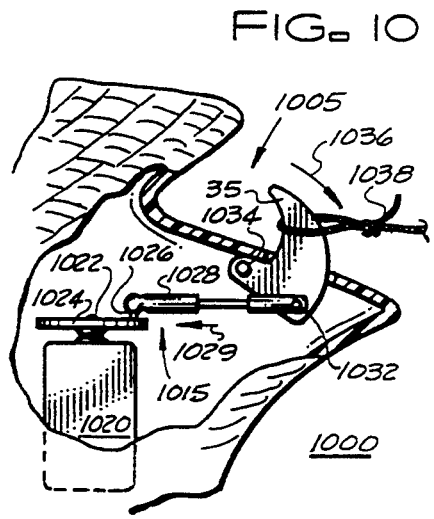
FIG. 10 illustrates a detailed side view, in partial section, of a portion of the remotely controlled duck decoy of FIGS. 1 through 3 and 6, including a tow hook and release mechanism together with an electromechanical servomechanism and linkage assembly for operating same.

It will be appreciated that other arrangements for controller 631 (FIGS. 6 and 9) may be employed and that any conventional lightweight servomechanism may be employed for servomechanisms 641 and 661 (FIG. 6) or 1020 (FIG. 10).

It will be appreciated that servomechanisms 641 and 661 (FIG. 6), 1020 (FIG. 10) and anchor motor 621 (FIG. 6) are illustrated as having particular types of mechanical linkages associated therewith. Mechanical linkages are manufactured in a wide variety of configurations for differing applications and other mechanical couplings may be readily substituted therefor without loss of functionality of the appurtenances associated therewith.

The remotely controlled decoy apparatus of FIGS. 1 through 3 thus provides safe and efficient retrieval of game and a variety of remotely controlled attributes via the mechanisms of FIGS. 6, 8 and 10. This apparatus also provides an alternative embodiment of a retrieval grasping apparatus as illustrated in FIGS. 11 through 13 and substantially as described herein.

The foregoing detailed description of the several embodiments of the instant invention for the purposes of explanation have been particularly directed toward the application as a hunting decoy including capabilities and apparatus directed to towing slave decoys, anchoring the decoy for luring purposes and incorporating a decoy and game retrieval feature. It will be appreciated, however, that such apparatus also has application as a marine biology/ornithology tool for purpose of studying wildfowl in their natural habitat and that other, related applications for the apparatus are also possible.

Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A remotely controlled floating decoy, comprising:
a buoyant body resembling a game bird;
a receiver disposed within said buoyant body, said receiver being responsive to commands from a transmitter and providing electrical control signals in response to said commands;
a propulsive device coupled to said buoyant body and electrically coupled to said receiver, said propulsive device being responsive to said electrical control signals;
a rudder coupled to a rear end of said buoyant body and responsive to said electrical control signals, said propulsive device and said rudder cooperating to provide directed locomotion for said buoyant body in response to commands transmitted from said transmitter;
a hook hingedly disposed beneath an upper surface of a rear end of said remotely controlled floating decoy and capable of projecting through said upper surface of said rear end of said remotely controlled floating decoy in a first position of said hook and substantially contained within said remotely controlled floating decoy in a second position of said hook;
a mechanical linkage having a first end coupled to said hook; and
a tailhook servomechanism electrically coupled to said receiver and responsive to said electrical control signals from said receiver and mechanically coupled to a second end of said mechanical linkage, said tailhook servomechanism for retracting said hook from said first position to said second position within said remotely controlled floating decoy via said mechanical linkage to release an object detachably coupled to said hook when so commanded via said transmitter.

2. A remotely controlled floating decoy, comprising:
a buoyant body resembling a game bird;
a receiver disposed within said buoyant body, said receiver being responsive to commands from a transmitter and providing electrical control signals in response to said commands;
a propulsive device coupled to said buoyant body and electrically coupled to said receiver, said propulsive device being responsive to said electrical control signals and including:
an electric motor,
a shaft having a first end mechanically coupled to said electric motor and extending from said electric motor rearward, said shaft rotating in response to rotation of said electric motor, and
a propeller mechanically coupled to a distal end of said shaft, said propeller rotating and providing propulsion to said remotely controlled floating decoy in response to said rotation of said electric motor;

a rudder coupled to a rear end of said buoyant body and responsive to said electrical control signals, said propulsive device and said rudder cooperating to provide directed locomotion for said buoyant body in response to commands transmitted from said transmitter;

a brush guard attached to a rear end of the remotely controlled floating decoy, said brush guard comprising a first series of stiff bristles extending from the rear end along a direction substantially parallel to said shaft and spaced apart therefrom, a second series of stiff bristles substantially orthogonal to said first series of stiff bristles, said first series of stiff bristles and said second series of stiff bristles forming a mesh substantially surrounding said propeller, said first series of stiff bristles and said second series of stiff bristles comprise wire bristles forming a closed basket substantially surrounding said propeller and said rudder, said closed basket being readily detachable from said buoyant body;

an anchor comprising a spool coupled via a cable to a weight;

an anchor motor coupled to said spool, said anchor motor providing first rotation in a first rotational direction in response to a first electrical control signal "DROP ANCHOR" from said receiver and providing second rotation in a second rotational direction counter-rotational to said first rotational direction in response to a second electrical control signal "RAISE ANCHOR" from said receiver; and an anchor servomechanism coupled to said anchor motor and to said receiver, said anchor servomechanism, for providing said first and second electrical control signals in response to said electrical control signals from said receiver.

3. A remotely controlled floating decoy, comprising:
a buoyant body resembling a game bird;
a receiver disposed within said buoyant body, said receiver being responsive to commands from a transmitter and providing electrical control signals in response to said commands;
a propulsive device coupled to said buoyant body and electrically coupled to said receiver, said propulsive device being responsive to said electrical control signals;
a rudder coupled to a rear end of said buoyant body and responsive to said electrical control signals, said propulsive device and said rudder cooperating to provide directed locomotion for said buoyant body in response to commands transmitted from said transmitter;
a lower mandible disposed at a front end of said buoyant body, said lower mandible having serrations disposed on an upper surface thereof, said lower mandible hingedly attached to said buoyant body;
a first mechanical linkage having a first end coupled to said lower mandible; and
a servomechanism electrically coupled to said receiver and mechanically coupled to a second end of said first mechanical linkage, said servomechanism being responsive to said electrical control signals and causing said lower mandible to raise in response to first electrical control signals "CLAMP" from said receiver and causing said lower mandible to lower in response to second electrical control signals "DO NOT CLAMP" from said receiver.

4. The remotely controlled floating decoy as claimed in claim 3, further comprising:
an upper mandible disposed at a front end of said buoyant body, said upper mandible having serrations disposed on a lower surface thereof, said upper mandible hingedly attached to said buoyant body; and
a second mechanical linkage having a first end coupled to said upper mandible, wherein said servomechanism is mechanically coupled to a second end of said second mechanical linkage, said servomechanism causing said upper mandible to lower in response to first electrical control signals "CLAMP" from said receiver and causing said upper mandible to raise in response to second electrical control signals "DO NOT CLAMP" from said receiver, said upper and lower mandibles forming a clamp wherein said upper and lower mandibles comprise opposable jaws of said clamp wherein said serrations disposed on said lower mandible and said serrations disposed on said upper mandible cooperate in grasping an object disposed therebetween when said upper and lower mandibles lower and raise, respectively, in response to said first electrical control signal "CLAMP" from said receiver.

5. The remotely controlled floating decoy as claimed in claim 3, further comprising an upper mandible which is fixed in position, said upper mandible having serrations disposed on a lower side thereof such that said serrations disposed on said lower mandible and said serrations disposed on said upper mandible cooperate in grasping an object disposed therebetween when said upper mandible raises in response to said first electrical control signal "CLAMP" from said receiver.

6. A remotely controlled floating decoy, comprising:
a radio transmitter adapted remote control, said radio transmitter providing commands comprising radio signals in response to manual requests entered on a control panel thereof;
a buoyant body resembling a duck, said buoyant body including a weighted keel suspended beneath said buoyant body, said weighted keep only partly counteracting buoyancy of said buoyant body, said weighted keel including a first opening disposed at a front end of said weighted keel and adapted to accept a towing attachment;
a radio receiver disposed within said buoyant body, said radio receiver being responsive to said commands from said radio transmitter and providing electrical control signals to a plurality of servomechanisms in response to said commands;
a propulsive device coupled to said buoyant body and to said radio receiver, said propulsive device including a first servomechanism of said plurality of servomechanisms, said first servomechanism being responsive to said electrical control signals, said propulsive device including:
an electrical motor,
a switch, said switch comprising a normally open, double pole, double throw switch, said switch mechanically coupled to said first servomechanism such that said first servomechanism places said switch in either closed position or an open position in response to commands from said radio receiver, said switch electrically coupled to said electric motor and to a battery holder such that polarities of terminals from said battery holder in a first thrown position of said switch are reversed with respect to said electric motor with respect to a second thrown position of said switch, said electric motor rotating in a first direction when said switch is placed in said first thrown position and rotating in a second direction counter rotational to said first direction when said switch is placed in said second thrown position, an elongate shaft having a first end mechanically coupled to said electric motor and extending from said electric motor rearward, said elongate shaft rotating in response to rotation of said electric motor, and a rudder coupled to a rear end of said buoyant body and mechanically coupled to a second servomechanism of said plurality of servomechanisms, said second servomechanism electrically coupled to said radio receiver and responsive to said electrical control signals, said propulsive device, said first servomechanism, said rudder and said second servomechanism cooperating to provide directed locomotion for said buoyant body in response to said commands transmitted from said radio transmitter;

an anchor comprising a spool coupled via a cable to a weight;

an anchor motor mechanically coupled to said spool, said anchor motor providing first rotation in a first rotational direction in response to a first electrical control signal "DROP ANCHOR" from said radio receiver and providing second rotation in a second rotational direction counterrotational to said first rotational direction in response to a second electrical control signal "RAISE ANCHOR" from said radio receiver; and an anchor servomechanism coupled to said anchor motor and to said radio receiver, said anchor servomechanism for providing said first and second electrical control signals in response to said electrical control signals from said radio receiver.

7. The remotely controlled floating decoy as claimed in claim 6, further including a weed guard comprising a closed basket substantially surrounding said propeller and said rudder, said closed basket being readily detachable from said buoyant body.

8. The remotely controlled floating decoy as claimed in claim 7, further comprising:

a hook hingedly disposed beneath an upper surface of a rear end of said remotely controlled floating decoy and capable of projecting through said upper surface of said remotely controlled floating decoy in a first position of said hook and substantially contained within said remotely controlled floating decoy in a second position of said hook; and a third servomechanism of said plurality of servomechanisms electrically coupled to said radio receiver and responsive to said electrical control signals from said radio receiver and mechanically coupled to said hook, said third servomechanism for retracting said hook from said first position to said second position to release an object detachably coupled to said hook when so commanded via said radio transmitter.

9. The remotely controlled floating decoy as claimed in claim 8, further comprising:

a lower jaw disposed at a front end of said buoyant body, said lower jaw hingedly attached to said buoyant body;

a first mechanical linkage having a first end coupled to said lower jaw; and a fourth servomechanism electrically coupled to said radio receiver and mechanically coupled to a second end of said first mechanical linkage, said fourth servomechanism being responsive to said electrical control signals and causing said lower jaw to raise in response to first electrical control signals "CLAMP" from said radio receiver and causing said lower jaw to lower in response to second electrical control signals "DO NOT CLAMP" from said radio receiver.

10. The remotely controlled floating decoy as claimed in claim 9, further comprising:

an upper jaw disposed at a front end of said buoyant body, said upper jaw hingedly attached to said buoyant body; and a second mechanical linkage having a first end coupled to said upper jaw, wherein said fourth servomechanism is mechanically coupled to a second end of said second mechanical linkage, said fourth servomechanism causing said upper jaw to lower in response to first electrical control signals "CLAMP" from said radio receiver and causing said upper jaw to raise in response to second electrical control signals "DO NOT CLAMP" from said radio receiver, said upper and lower jaws forming a clamp wherein said upper and lower jaws a clamp wherein said lower jaw and said upper jaw cooperate in grasping an object disposed therebetween when said upper and lower jaws lower and raise, respectively, in response to said first electrical control signal "CLAMP" from said radio receiver.

* * * * *